US007558826B1

United States Patent
Sievers et al.

(10) Patent No.: US 7,558,826 B1
(45) Date of Patent: Jul. 7, 2009

(54) METHODS, SYSTEMS, AND DATA STRUCTURES FOR ELECTRONIC ADDRESSING

(75) Inventors: A. Kent Sievers, Orem, UT (US); David R. Hansen, Highland, UT (US)

(73) Assignee: Novell, Inc., Provo, UT (US)

( * ) Notice: Subject to any disclaimer, the term of this patent is extended or adjusted under 35 U.S.C. 154(b) by 1180 days.

(21) Appl. No.: 10/099,789

(22) Filed: Mar. 15, 2002

(51) Int. Cl.
*G06F 15/16* (2006.01)
(52) U.S. Cl. .................. 709/206; 709/229; 709/245
(58) Field of Classification Search ............. 709/206, 709/245, 229
See application file for complete search history.

(56) References Cited

U.S. PATENT DOCUMENTS

| | | | | |
|---|---|---|---|---|
| 5,822,526 | A | 10/1998 | Waskiewicz | 395/200.36 |
| 5,856,974 | A | 1/1999 | Gervais et al. | 370/392 |
| 5,878,230 | A | 3/1999 | Weber et al. | 395/200.68 |
| 5,923,845 | A | 7/1999 | Kamiya et al. | 395/200.36 |
| 6,035,326 | A | 3/2000 | Miles et al. | 709/206 |
| 6,182,273 | B1 * | 1/2001 | Tarumi | 717/101 |
| 6,684,248 | B1 * | 1/2004 | Janacek et al. | 709/225 |
| 6,708,205 | B2 * | 3/2004 | Sheldon et al. | 709/206 |
| 6,901,436 | B1 * | 5/2005 | Schneider | 709/219 |
| 2001/0039592 | A1 * | 11/2001 | Carden | 709/245 |
| 2002/0065894 | A1 * | 5/2002 | Dalal et al. | 709/206 |
| 2002/0129111 | A1 * | 9/2002 | Cooper | 709/207 |
| 2002/0169840 | A1 * | 11/2002 | Sheldon et al. | 709/206 |
| 2003/0115280 | A1 * | 6/2003 | Quine et al. | 709/207 |

* cited by examiner

*Primary Examiner*—Liangche A Wang
(74) *Attorney, Agent, or Firm*—Schwegman, Lundberg & Woessner, P.A.

(57) ABSTRACT

Methods, systems, and data structures are provided for electronic addressing. An electronic address is defined by a preferred domain name, one or more allowable domain names, a preferred electronic address format, and one or more allowable electronic address formats. Moreover, received electronic addresses are bound by separating the received electronic addresses into components and comparing combinations of the components against the preferred and allowable domain names and the preferred and allowable electronic address formats. Additionally in one embodiment, resource attributes are dynamically acquired from resource objects within a directory and compared against the components and used in connection with addressing policies to bind received electronic addresses.

7 Claims, 3 Drawing Sheets

METHODS, SYSTEMS, AND DATA STRUCTURES FOR ELECTRONIC ADDRESSING

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, Novell, Inc., All Rights Reserved.

FIELD OF THE INVENTION

The present invention relates to electronic addressing, and in particular to methods, systems, and data structures used to define and bind electronic addresses.

BACKGROUND OF THE INVENTION

Electronic addresses are pervasive in today's highly connected society. Although electronic addresses are generally associated with electronic mail (email), electronic addressing is much broader. For example, an electronic address permits the unique identification of individuals, groups, software applications, electronic accounts, and the like. Moreover, electronic addressing can provide handles for applications allowing collaboration among various applications.

Typically, an organization and/or an enterprise are forced to manage large numbers of electronic addresses. These electronic addresses are frequently added, changed, and/or modified within the organization and/or the enterprise. Accordingly, attempting to administer electronic addresses within the organization and/or the enterprise becomes challenging software development, maintenance, and support exercises, which can consume considerable resources of the organization and/or the enterprise.

Furthermore, an organization's email system can include many thousands of electronic mail (e.g., email) addresses. Conventionally, these electronic addresses are hard coded within the email system. And generally, the organization follows a standard email addressing policy such that a single format can be used to reliably identify a single individual's email address within the organization.

For example, some organizations may enforce an email addressing policy that identifies individuals by only their last names followed by an "@" delimiter and the organization's domain name (e.g., organization.com, organization.edu, organization.org, and others). If the organization is a small organization, then adopting such a policy may not cause conflicts for the organization's email addressing policy. Conflicts occur when the email addressing policy adopted by the organization fails to produce a unique email address (e.g., two or more individuals within the organization have the same email address).

So, in the presented example, if the organization had two individuals with a last name of "Smith," then exceptions to the policy would have to be instituted by the organization, since two email addresses identified, as a single email address of "smith@organization.com" would result, if the organization's email addressing policy were not augmented in some way to prevent the conflict.

One such modification might be to permit an individual's first initial to appear appended to the beginning of the individual's last name followed by the "@" character and the organization's domain name. Thus, if the first names of the two Smiths were Kent and Dave, then the respective email addresses would be "ksmith@organization.com" and "dsmith@organization.com." Of course since the first initial is now permissible within the organization's email addressing policies, each and every email address will now also include alternate email addresses reflecting the augmented policy. And, each and every email address will have to be manually updated to reflect the augmented policy.

Additionally, in some instances when an electronic addressing policy is changed, the changed policy can invalidate previous acceptable electronic addresses. When this occurs within an organization, modifications to each affected electronic address must be made within the organization, or previously acceptable electronic addresses will fail. Having electronic addresses fail can be catastrophic for the ongoing business of the organization.

In fact, electronic addressing policies change frequently based on additional conflicts or improvements made to the policies to improve operational efficiency within organizations. As a result, the organizations are forced to continually evaluate and decide whether it is appropriate and necessary to update or modify policies. But, since the electronic addresses are generally hard coded within the organizations' systems (e.g., email systems, database systems, messaging systems, and the like) making modifications to existing policies require manually changing each and every electronic address affected by the changed policy.

In many circumstances, the manual exercise of changing each and every affected electronic address will consume precious software development, support, and maintenance resources within the organization, since each and every affected resource within the organization must be manually modified when policies change or are augmented in some way.

As is now apparent to one of ordinary skill in the art, conventional electronic addressing policies within organizations are based on static policies that cannot be dynamically modified by the organization. Such rigid hard coded policies are not conducive to the dynamic environment of the organizations, and therefore are inefficient.

As is now apparent, there exists a need for improved techniques that institute dynamic electronic addressing policies so that an organization is free to change, add, or augment existing policies without having to manually alter existing electronic addresses within the organization. Furthermore, there exists a need for techniques that do not require electronic addresses to be hard coded within the systems of the organization.

SUMMARY OF THE INVENTION

In various embodiments of the present invention, techniques for defining and binding electronic addresses are described. Electronic addresses are defined with preferred and allowable electronic address formats. Furthermore, electronic addresses are bound by using the preferred and allowable formats, by dynamically acquiring attributes from directory resources, and by using dynamically configurable addressing policies.

More specifically and in one embodiment of the present invention, a method for defining an electronic address is presented. A preferred domain name and one or more allowable domain names are selected. Furthermore, a preferred address format and one or more allowable address formats are selected. The preferred domain name, the one or more allowable domain names, the preferred address format, and the one or more allowable address formats are retained in order to define the electronic address.

In another embodiment of the present invention, a method to bind an electronic address is described. The electronic address is received and separated into a domain name and a prefix address component. Moreover, the prefix address component is separated into one or more sub prefix address components. One or more allowable resolvable address formats are determined by using combinations of the one or more sub prefix address components. And, electronic address is bound by using the domain name, the determined one or more resolvable address formats, and the one or more sub prefix address components.

In still another embodiment of the present invention, an electronic addressing system is presented. The system includes a directory, a data store, and an addressing set of executable instructions. The directory includes one or more resource objects that include resource attributes. The data store includes entries that define electronic addressing policies for a number of the resource objects, where each entry includes a preferred domain name, one or more allowable domain names, a preferred address format, and one or more allowable address formats. The addressing set of executable instructions binds received electronic addresses by using the directory and the data store.

In yet another embodiment of the present invention, a data structure residing on a computer readable medium used to bind an electronic address is described. The data structure includes a preferred domain name, one or more allowable domain names, a preferred electronic address format, and one or more allowable electronic address formats. The data structure is used in connection with dynamically acquired resource information to bind the electronic address.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
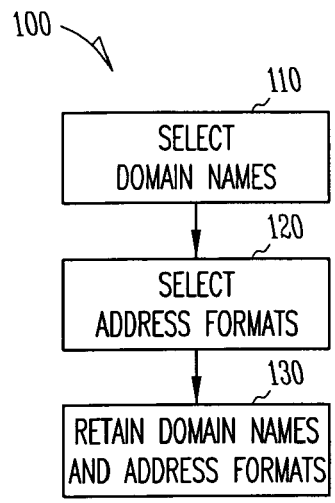
FIG. 1 is a flowchart representing a method for defining an electronic address, according to the teachings of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive, and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other techniques of providing information to the system for data storage.

As used herein an "electronic address" refers to any sequence of electronic characters that is used as a handle to identify a user, a group of users, an electronic account, an electronic application, and the like. In one embodiment, an electronic address is an email address having a prefixed component and an Internet domain name. And, a delimiting character (e.g., "@") separates the prefixed component and the Internet domain name. The prefixed component attempts to uniquely provide a handle to a resource identified within the environment defined by the Internet domain name. Furthermore, in some embodiments, the prefixed component can be separated into one or more sub prefix addressing components. Each of the sub prefix addressing components identifies a structural element of the prefixed component, and the sub prefix addressing components can be organized in a variety of permutations or combinations to locate allowable permutations that identify resources within the environment.

An "address format" refers to variable electronic characters that define types of electronic characters that are permissible. For example, an address format can be identified as "+FN.+LN" where "+FN" represents a first name of a user that is to be followed by a period (e.g., ".") and a last name of the user (e.g., "+LN). Address formats are dynamically evaluated and populated with appropriate values of electronic values. In some embodiments, the dynamic population occurs within a directory service by acquiring resource attributes from various hierarchical levels within the directory service. Address formats define acceptable values and sequences of values for electronic addresses without explicitly having to define all possible acceptable values and sequences of values.

Furthermore, in one embodiment, the present disclosure is implemented using a directory having a plurality of directory resources. Access to attributes associated with directory resources within the directory can be obtained by using a NetWare product, an eDirectory product, a ZENworks product, and a DirXML product, all of which are distributed by Novell, Inc. of Provo, Utah. Moreover, in some embodiments, electronic addresses are defined and resolved within an email system environment, where the email system is a Groupwise system distributed by Novell, Inc. of Provo, Utah. Of course any software product providing directory services and any software product defining and resolving electronic addresses that include domain names can benefit from the teachings of the present disclosure and are intended to fall within the scope of the present disclosure.

FIG. 1 illustrates a flowchart representing one method 100 for defining an electronic address, according to the teachings of the present invention. Initially an electronic address is defined by selecting a preferred domain name in 110. A domain name can include any Internet accessible domain name, such as ".com," ".edu," ".org," ".gov," ".bus," ".pro," any country domain (e.g., ".uk"), and others. Selection of the preferred domain name can be by a user or by an administrator interfacing with an interface, such as a graphical user interface (GUI).

In addition to selecting a preferred domain name, one or more allowable domain names are also selected in 110. Allowable domain names are domain names that are acceptable to reach a resource in addition to the preferred domain name. A resource is a defined object within a directory system such as a user, a group of users, a department, an electronic post office, a software application, a geographic location, a user's job function, a hardware device, and the like. For example, a preferred domain name can be ".com" and allowable domain names can be ".edu" and ".org."

In 120, a preferred address format is selected. The address format includes a variable indication as to a resource's preferred electronic address format. An electronic address is definable by using permutations or combinations of address formats, a delimiting character (e.g., "@"), and domain names. Moreover, in addition to the preferred address format, one or more allowable address formats are selected in 120.

In some embodiments, the address format includes variable sub strings that identify components of the address. For example, a "+FN" sub string can identify a resource's first name, when the resource has a first name. Moreover, a "+LN" sub string can identify the resource's last name, when the resource has a last name. Accordingly, one example address format can include the string "+FN.+LN" where two component sub strings (e.g., "+FN" and "+LN") are separated by a delimiter character (e.g., a period "."). Of course as one of ordinary skill in the art readily appreciates, a variety of variable sub strings can be implemented to define components of the address format, all of which are intended to fall within the scope of the present disclosure. Moreover, a variety of delimiting characters (e.g., "-," "_," and the like) can be used to uniquely identify and separate components within the address format.

In 130, the preferred domain name, the allowable domain names, the preferred address format, and the allowable address formats are retained to define the electronic address. In this way, electronic addresses are variably defined and can include a variety of formats that are resolved using the retained information. As one of ordinary skill in the art readily appreciates, this does not require hard coding information to represent all the allowable explicit values that the electronic address can be, since the formats can be used to dynamically resolve any particular electronic address by acquiring attributes from resources within a directory and organizing the attributes into the formats for comparisons against any specifically processed electronic address. Moreover, there is no requirement that the values associated with the address formats be acquired from directory resources, since as one of ordinary skill in the art readily recognizes, the values can be obtained from any available electronic storage location or locations (e.g., files, cache, databases, and the like).

In one embodiment, the electronic address can also include an explicit value for the address format, in this way a resource can override any associated or resolved value for the address format with a resource defined value identified as the explicit value. For example consider an email system having resources defined as users, where one user identified as "Kent Sievers" with an allowable address format for the user's email address of "+FN.+LN." However, the user desires to be known as just "Kent," then the user can provide the explicit string value of "Kent" to augment the allowable address format. Thus, when the user responds to or sends an email, the displayed address can be "Kent" while the actual resolvable address associated with the address "Kent" will be "Kent.Sievers@organization.com."

Additionally, since the address formats are definable as components, the order of the components need not be defined as long as the components can be identified and organized into at least one of the allowable address formats. In this way, if one allowable address format was defined as "+FN.+LN," then a received electronic address having a format of "+LN.+FN" can still be resolved, since the received address is separated into two components namely "+LN" and "+FN," which are then arranged in an order that matches the allowable address format, namely "+FN.+LN."

Of course in some instances it may not be possible to distinguish a first name from a last name in a received electronic address, especially when attempting both orders (e.g., "+FN.+LN" and "+LN.+FN") will produce more than one electronic address, when attributes are acquired and used to populate the components for comparison against the received electronic address. In these instances, the order of the address format can be enforced by using additional notation within the address format, such as "!+FN.+LN" where the "!" character indicates order is to be enforced. Alternatively, by default the order of the components can be enforced and the additional notation can be used to make the components order independent.

Furthermore, in some embodiments, the electronic address can also be defined by one or more policies. Policies are rules used when attempting to resolve and bind an electronic address. For example, a policy can disallow the use of an address format identified as only a last name (e.g., "+LN"), prefer some domain names over others (e.g., ".edu" over ".com"), prefer some address formats over others (e.g., "+FN.+LN" over "+LN.+FN"), prefer some components of address formats over others (e.g., "+FN" over "+NN" represents a nickname), prefer some attributes associated with candidate addresses over others (e.g., hidden candidate addresses, proximity of candidate addresses to another resource), and the like. The policies can also be ordered such that each policy is processed when a preceding policy failed to resolve and bind the electronic address. In this way, policies can improve the operational efficiency associated with resolving and binding electronic addresses to resources. Also, the policies can be dynamically configured and customized to improve processing efficiency based on the organization's existing pool of electronic addresses and the known usage of those electronic addresses.

Figure 2:
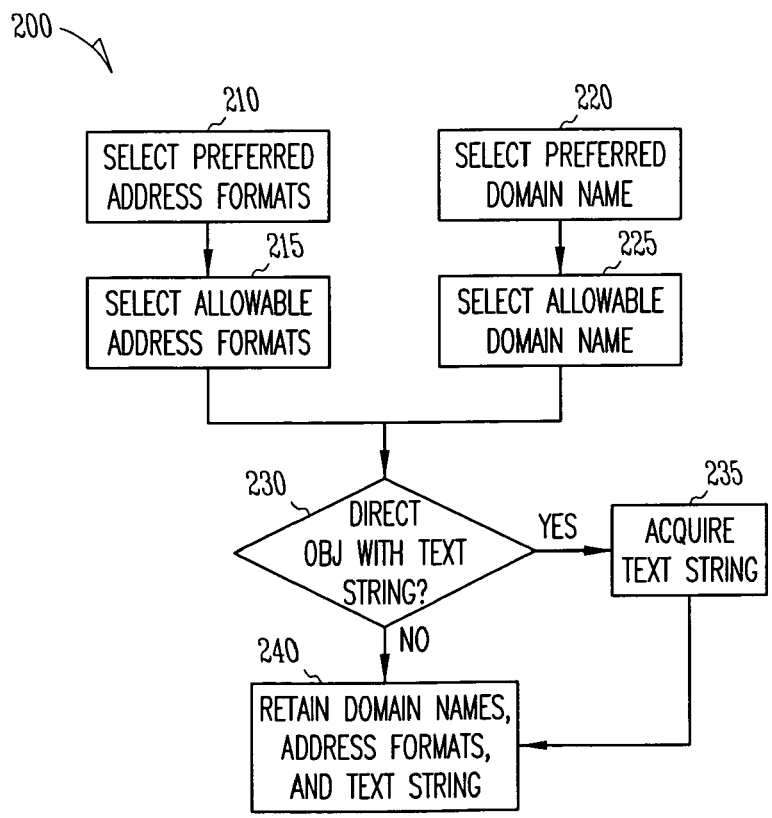
FIG. 2 is a flowchart representing another method for defining an electronic address, according to the teachings of the present invention.

FIG. 2 illustrates a flowchart representing another method 200 for defining an electronic address, according to the teachings of the present invention. In 210 a preferred address format is selected for the electronic address. In 215 after a preferred address format is selected, one or more allowable address formats are selected for the electronic address.

Address formats are variable strings that can include, in some embodiments, variable sub strings that identify subcomponents within the address format. Subcomponents in some embodiments include variable sub strings representing an electronic login name, an administrator defined identification, an application name, a first name, a last name, a middle initial, a middle name, a nickname, and the like. Also, in some embodiments, the subcomponents are selected within the address formats irrespective and independent of any order of the subcomponents within the address formats. Further, address formats do not represent explicit values for the electronic address.

Moreover, in 220, a preferred domain name is selected for the electronic address. A domain name can be any valid Internet domain name. Additionally, in 225, one or more allowable domain names are selected for the electronic address. Unlike the address formats, the domain names represent explicit string values that represent acceptable Internet domain names.

In one embodiment, the electronic address can also be defined by checking a resource that is being represented by the electronic address for an explicit electronic address value identified as a text string in 230. Correspondingly, if the text string is present, the explicit electronic address represented by the text string is acquired from the resource in 235.

In a directory environment the resource can be represented as a node (e.g., directory object) within a directory hierarchy, and the text string can be a value identified with an attribute of the node (e.g., electronic address attribute). In this way, accessing the resource's directory node and looking for any non-null string assigned to the appropriate node attribute is one technique for acquiring the text string and determining if the text string is present. Moreover, the text string can be calculated by using attributes associated with a plurality of nodes within the directory. For example, child nodes within a directory can inherit attributes from parent nodes within the directory. And, as one of ordinary skill in the art appreciates, the acquisition of any text string can be dynamically accomplished in a directory environment. In other words, the presence of the text string need not be explicitly selected or defined; rather, the presence of the text string can be automatically detected, calculated, and acquired within a directory environment.

Once the preferred domain name, the allowable domain names, the preferred address format, and the allowable address formats are selected and the presence of any explicit preferred value for the electronic address is automatically determined, then in 240 this information is retained to define the electronic address. Retention can be achieved by storing the information within a system using the electronic addresses (e.g., email system, database system, or any application system), within a separate data store, within a separate file, and the like.

The electronic address is then defined once the information is retained. Accordingly, any resolution or binding of the electronic address occurs by dynamically acquiring attributes from resources being defined by a received electronic address to form a list of potential candidate addresses. And, if the list includes more than one potential candidate address, then, in some embodiments, dynamic policies can be used to reduce the list of potential candidate addresses to a single candidate address which is then bound to the received electronic address. Of course it may not always be possible to reduce the list of potential candidate addresses to a single candidate address, but the present disclosure offers improved and more flexible techniques for attempting to locate a single candidate address by defining an electronic address as domain names and address formats and combining the electronic address definition with policies.

Figure 3:
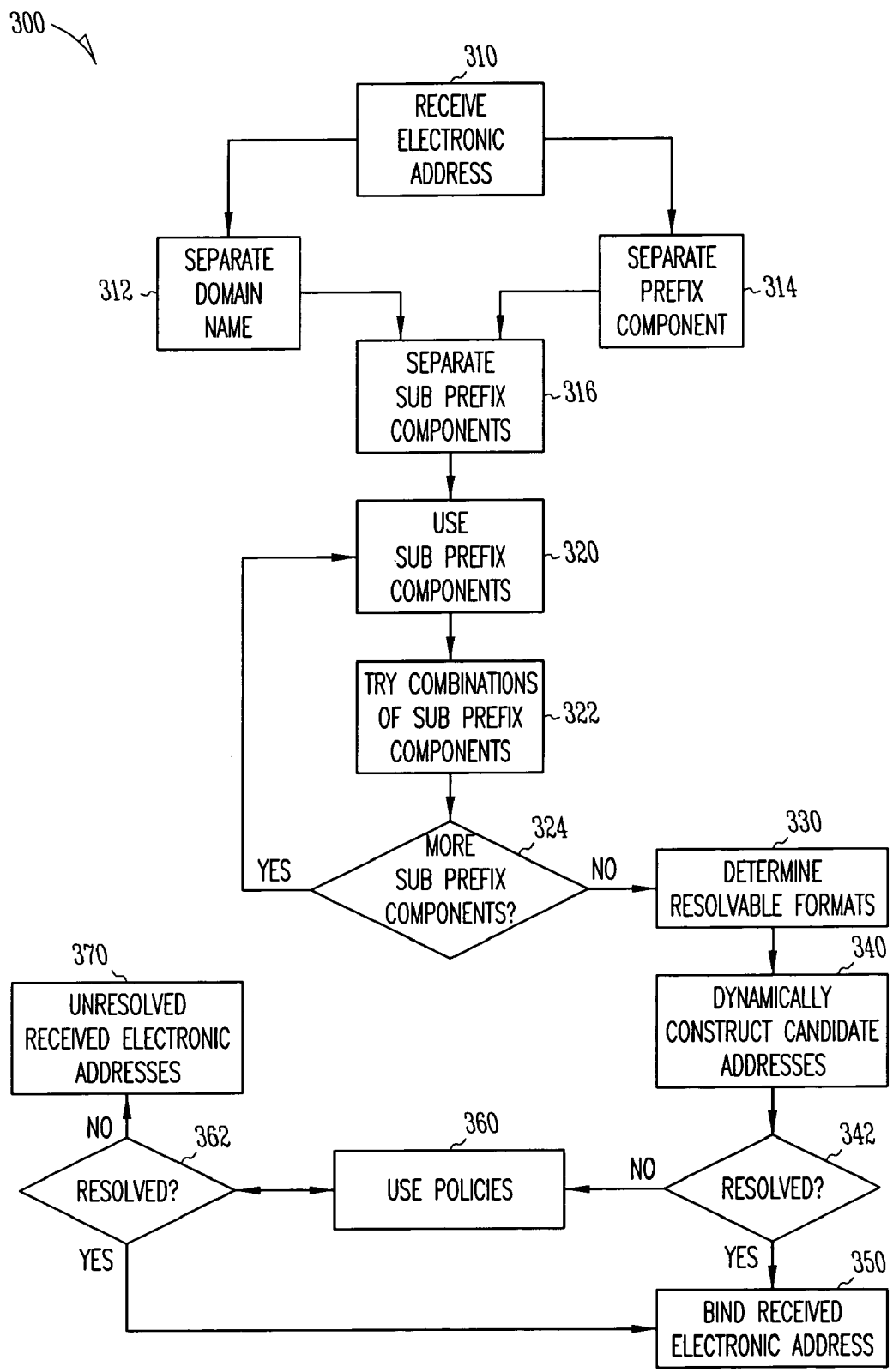
FIG. 3 is a flowchart representing a method for binding an electronic address according to the teachings of the present invention.

FIG. 3 illustrates a flowchart representing one method 300 for binding an electronic address according to the teachings of the present invention. In 310 an electronic address is received. In one embodiment, the electronic address represents a user, a group of users, an electronic mailbox, an electronic account, an electronic application, and the like. Further, in some embodiments, the electronic address is being received by a system that uses the electronic address (e.g., an email system, an application system, a database system, and others). In other embodiments, the electronic address is being received by a customized set of executable instructions that interfaces with the systems to provide electronic addresses in resolvable formats required by the systems.

Once the electronic address is received, then a delimiter (e.g., "@" character) is detected, and the string following the delimiter is separated from the electronic address in 312 and identified as the domain name of the received electronic address. Moreover, in 314, the string that precedes the delimiter is separated from the electronic address and identified as a prefix address component associated with the received electronic address.

Furthermore, one or more additional delimiters (e.g., "-" character, "_" character, "." character, and the like) are detected within the prefix address component in order to separate the prefix address component into one or more sub prefix address components in 316. Of course it is readily apparent to one of ordinary skill in the art that no additional delimiters are necessary at all to separate the sub prefix address components, since it can be that a certain predefined number of characters within the prefix address component provides a fielded delimiter. For example, if the prefix address component includes a first initial followed by a last name, then the prefix address component can be separated into two sub prefix address components by taking the first character from the prefix address component as a first sub prefix address component and the remainder of the prefix address component as a second sub prefix address component. Any this way, any technique to separate the prefix address component into one or more sub prefix address components is intended to fall within the scope of the present disclosure.

In 320, the sub prefix components are used or otherwise processed by trying or organizing, in 322, all combinations and sequences of the sub prefix address components. Accordingly, a check is made in 324 to determine if all combinations of the sub prefix address components have been exhausted, and if not processing returns to 320 until all combinations have been determined.

Once all sub prefix address component combinations are exhausted, then a lookup occurs to determine in 330 all resolvable address formats. The lookup entails searching for electronic addresses defined in a format as discussed above with the description of FIGS. 1 and 2. This process eliminates a number of the sub prefix address component combinations determined in 320, 322, and 324.

Next, in 340, resource attributes are acquired in order to dynamically construct one or more candidate addresses. Each of the resolvable address formats is associated with one or more resources, and the resources include attributes that represent values for the resolvable address formats. Each instance of a populated resolvable address format represents a single candidate address, which can be potentially bound to the received electronic address.

In some embodiments, the resources (e.g., users, groups of users, geographic locations, electronic mailboxes, electronic accounts, electronic applications, hardware devices, departments, domains, user job functions, and the like) are represented as nodes (e.g., directory objects) within a directory, and the attributes include information about the node (e.g., node name, first name, last name, middle initial, middle name, nickname, department, job function, preferred domain name, allowable domain names, preferred address format, allowable address formats, security level, proximity to other nodes, and others).

Moreover, in a hierarchical directory, child nodes can inherit attributes from parent nodes. For example, a resource representing a user in a directory can be a child node to a parent node representing a domain ".edu" such that the preferred domain name of the user is inherited from the parent node. In this way, attributes are dynamically acquired from the directory by accessing nodes within the hierarchy.

In 342, a check is made to determine if the one or more resolvable addresses formats is associated with a single dynamically constructed candidate address, and if so in 350 the received electronic address is bound to the single dynamically constructed candidate address. However, if more than one dynamically constructed candidate address are present, then, in some embodiments, policies are used in 360 to further eliminate candidate addresses until a single candidate address is determined and bound to the received electronic address.

In one embodiment, policies are rules used when attempting to resolve and bind the received electronic address. For example, a policy can disallow the use of a prefix address component identified as only a last name (e.g., "+LN"), disallow the use of some domain names from consideration, prefer some domain names over others (e.g., ".edu" over ".com"), prefer internal candidate addresses over external candidate addresses, prefer some prefix address component strings over others (e.g., "+FN.+LN" over "+LN.+FN"), prefer some sub prefix address components over others (e.g., "+FN" over "+NN" represents a nickname), prefer some attributes associated with candidate addresses over others (e.g., hidden candidate addresses, proximity of candidate addresses to another resource), and the like.

Further in some embodiments, the policies can be dynamically configured and serially processed in a defined order to optimize the elimination of candidate addresses from consideration. After a single policy is enforced, a check is made in 362 to determine if a single candidate address is present, and if so, the single candidate address is bound to the received electronic address in 350. Otherwise, the next policy is enforced in 360 until all policies have been attempted. If all policies have been processed and there is still more than one candidate address associated with more than one resource, then in 370 it is determined that the received electronic address is not resolvable.

Figure 4:
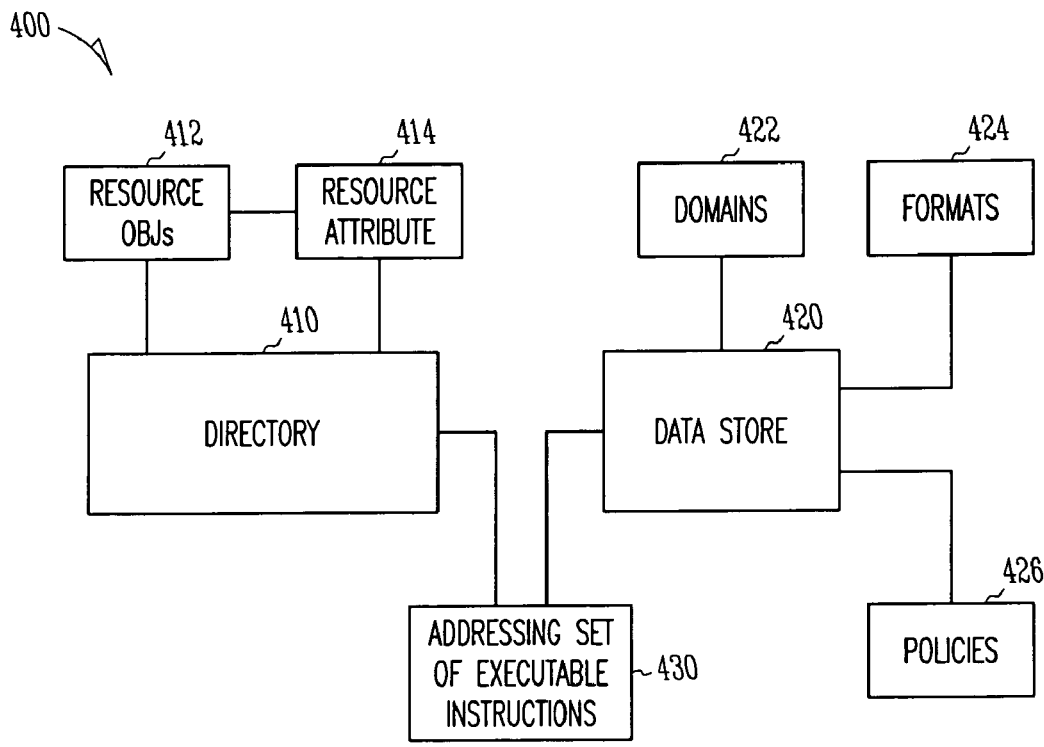
FIG. 4 is a block diagram of an electronic addressing system, according to the teachings of the present invention.

FIG. 4 illustrates block diagram of one electronic addressing system 400, according to the teachings of the present invention. The electronic addressing system 400 includes a directory 410 having resource objects 412 (e.g., directory nodes) associated with resource attributes 414 (e.g., information about the resource objects 412). The electronic addressing system 400 also includes a data store 420 having domain names 422, electronic address formats 424, and electronic addressing policies 426. Further, the electronic addressing system 400 includes an addressing set of executable instructions (ASEI) 430.

The data store 420 includes entries that define electronic addressing policies for the resource objects 412. Each entry includes a preferred domain name and allowable domain names selected from the domains 422. Moreover, each entry includes a preferred address format and allowable address formats selected from the address formats 424.

The ASEI 430, when attempting to bind a received electronic address, dynamically acquires from the resource attributes 414 specific values for the preferred address format and the allowable address formats. Each attribute populated instance of a preferred address format and allowable address formats represents candidate addresses that can be potentially bound to the received electronic address. If more than one instance is present, then the ASEI 430 enforces the policies 426 to eliminate multiple instances in an attempt to acquire a single instance that can be bound to the received electronic address. In this way, the ASEI 430 uses the directory 410 and the data store 420 to bind the received electronic address to an address associated with a resource object 412.

In one embodiment, the resource objects 412 are organized as a hierarchy of resource objects 412 within the directory 410. Each resource object 412 is a node within the directory 410 hierarchy. And, children resource objects 412 inherit addressing policies 426 and resource attributes 414 from parent resource objects 412. Moreover, in one embodiment, the resource objects 412 can represent a user, a department, an electronic post office, a geographic location, a user job function, a hardware device, and the like.

Also, in some embodiments, the data store 420 or optionally the resource attributes 414 associated with a specific resource object 412 can include a text string representing an explicit string value for the specific resource object's 412 preferred electronic address. The text string permits the specific resource object 412 to have an explicit electronic address, in addition to any preferred address format and/or allowable address formats associated with the specific resource object 412.

The ASEI 430 interacts with the directory 410 and the data store 420, to bind a received electronic address. In one embodiment, the ASEI 430 parses the received electronic address into a domain name and a prefix address component. Next, the ASEI 430 parses the prefix address component into one or more sub prefix address components. Each permutation or combination of sub prefix address components are arranged and compared against the formats 424 in the data store 420, and unacceptable permutations are eliminated from consideration. Resource attributes are then acquired and populated to the remaining permutations to obtain specific candidate addresses that are compared against the received electronic address for a match. If more than one match occurs, then the ASEI 430 serially enforces the policies 426 until a determination is made that a single candidate address remains that can be bound to the received electronic address, or that multiple candidate addresses remain such that the received electronic address cannot be bound to any specific address.

In one embodiment, the ASEI 430, also permits the domains 422, the formats 424, and the policies 426 to be defined for resource objects 412 using one or more inputting and defining sets of executable instructions. In some embodiments, these instructions provide an administrator with a graphical user interface (GUI) to input and define the domains 422, the formats 424, and the policies 426.

Figure 5:
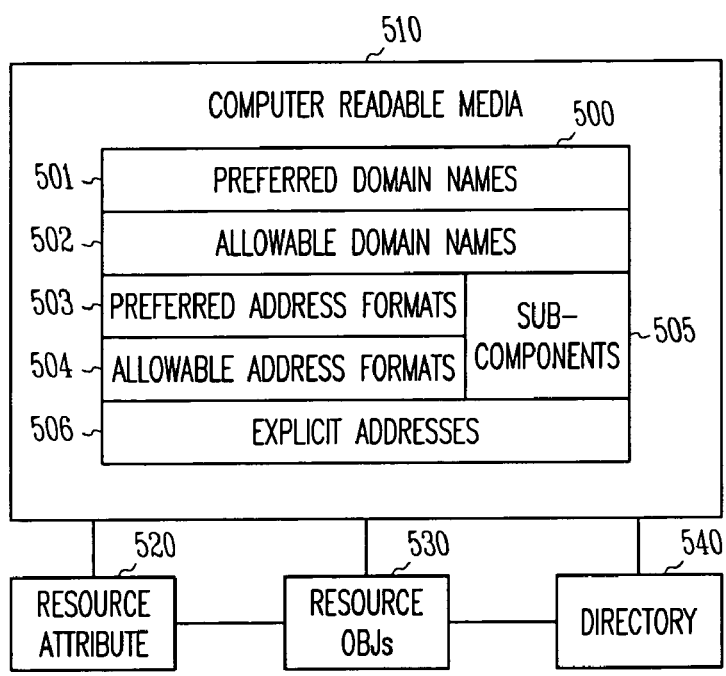
FIG. 5 is a block diagram of a data structure, according to the teachings of the present invention.

FIG. 5 illustrates a block diagram of one data structure 500, according to the teachings of the present invention. The data structure 500 includes a preferred domain name 501, allowable domain names 502, a preferred address format 503, and allowable address formats 504. Moreover, the preferred address format 503 and the allowable address formats 504 include one or more subcomponents 505. The formats 503 and 504 do not represent explicit values for an electronic address; rather, the formats 503 and 504 define acceptable structure for an electronic address. Conversely, the domains 501 and 502 are explicit values for acceptable domains for an electronic address.

The subcomponents 505 provide additional differentiation within the address formats 503 and 504. For example, the subcomponents can identify a first name, a last name, a middle initial, a middle name, a nickname, a device name, an application name, and the like. The order of the subcomponents 505 in forming the address formats 503 and 504 can be enforced or optionally appear in any order.

Also, in one embodiment, the data structure 500 includes an explicit address 506 representing an explicit and preferred string value for the address formats 503 and 504. In this way, a specific preferred value for an electronic address is readily identified and associated with the data structure 500.

The data structure 500 resides on one or more computer readable media and is used in connection with dynamically acquiring resource attributes 520 to bind an electronic address with a specific resource object 530. In one embodiment, the resource objects 530 are organized hierarchically within a directory 540 and are represented as nodes within the directory 540. The resource attributes 520 include information about the resource objects 530. In this way, child resource objects 530 can inherit resource attributes 520 from parent resource objects 530 within the directory 540. Correspondingly, some of the resource attributes 520 associated with a specific resource object 530 are derived from within the directory 540 hierarchy.

Moreover, as one of ordinary skill in the art readily recognizes, the data structure 500 need not be contiguously stored as a single structure, since the components of the data structure 500 can be dynamically and logically associated to form data structure 500. Further, some of the components of data structure 500 can be dynamically acquired from the resource objects 530 and/or the directory 540.

One of ordinary skill in the art now appreciates that electronic addresses can be flexibly defined by using preferred domain names, allowable domain names, preferred address formats, and allowable address formats. Moreover in some embodiments, the electronic addresses can include explicit electronic address values desired by a resource. Furthermore, dynamically enforced and configurable policies assist in more efficiently resolving and binding received electronic addresses. The teachings of the present invention are particularly well suited for the maintenance, development, and support of email systems, although the teachings of the present disclosure can be implemented in any software application where electronic addresses that include domain names are being managed, defined, and resolved.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A computer-implemented method for defining an electronic address, comprising:
    selecting a preferred domain name;
    selecting one or more additional domain names in addition to the preferred domain name;
    selecting a preferred address format;
    selecting one or more additional address formats in addition to the preferred address format; and
    retaining the preferred domain name, the one or more additional domain names, the preferred address format, and the one or more additional address formats to define the electronic address, wherein the preferred domain name and the one or more additional domain names include an Internet domain name selected from one or more of the following domain names: ".com," ".edu," ".org," ".gov," ".bus," ".pro," and a country domain, wherein the preferred address format and the one or more additional address formats are separated from the preferred domain name and the one or more additional domain names by a delimiter and the preferred address format and the one or more additional address formats uniquely identifies a handle to a resource within an environment defined by the Internet domain name, and wherein the electronic address is used to route and to deliver messages over the Internet to the resource defined by the electronic address, and wherein the electronic address is defined as variable electronic characters that define permissible types of electronic characters that are permissible within the email address, and wherein the email address is resolved within an email system using a directory service to acquire attributes for the resource that populate values for the variable electronic characters to define the email address for the resource, and wherein the preferred domain name and the one or more additional domain names are explicit string values populated to portions of the variable electronic characters, and wherein the preferred domain name is inherited within a directory from a parent node of the directory.

2. The method of claim 1, further comprising acquiring a text string associated with a preferred electronic address and retaining the text string to further define the electronic address.

3. The method of claim 2, wherein in acquiring the text string, the text string is dynamically acquired from a directory object, when present in the directory object.

4. The method of claim 2 wherein in acquiring the text string, the preferred electronic address is calculated from a directory.

5. The method of claim 1, wherein in selecting the preferred address format and the one or more additional address formats, the formats include one or more subcomponents.

6. The method of claim 1, wherein in selecting the preferred address format and the one or more additional address formats, the one or more subcomponents are order independent within the preferred address format and the one or more additional address formats.

7. The method of claim 1, wherein in selecting the preferred address format and the one or more additional address formats, the preferred address format and the one or more additional address formats include one or more subcomponents, and wherein the one or more subcomponents include at least one of an electronic login name, an administrator defined identification, a first name, a last name, a middle initial, a middle name, and a nickname.

* * * * *